(12) United States Patent
Aakenes et al.

(10) Patent No.: US 9,676,057 B2
(45) Date of Patent: Jun. 13, 2017

(54) DEVICE FOR SOLID STATE JOINING OF LIGHT METALS

(71) Applicant: Hybond AS, Eidsvaag i Romsdal (NO)

(72) Inventors: Ulf Roar Aakenes, Eidsvaag i Romsdal (NO); Öystein Grong, Ranheim (NO); Tor Austigard, Eide (NO)

(73) Assignee: HYBOND AS, Romsdal (NO)

( * ) Notice: Subject to any disclaimer, the term of this patent is extended or adjusted under 35 U.S.C. 154(b) by 256 days.

(21) Appl. No.: 14/368,039

(22) PCT Filed: Dec. 21, 2012

(86) PCT No.: PCT/NO2012/050255
§ 371 (c)(1),
(2) Date: Jun. 23, 2014

(87) PCT Pub. No.: WO2013/095160
PCT Pub. Date: Jun. 27, 2013

(65) Prior Publication Data
US 2014/0361006 A1 Dec. 11, 2014

(30) Foreign Application Priority Data

Dec. 22, 2011 (NO) .................................... 20111769

(51) Int. Cl.
*B23K 13/01* (2006.01)
*B23K 20/233* (2006.01)
(Continued)

(52) U.S. Cl.
CPC ........ *B23K 20/2336* (2013.01); *B21C 23/005* (2013.01); *B23K 20/001* (2013.01);
(Continued)

(58) Field of Classification Search
CPC .............. B23K 20/2336; B23K 20/001; B23K 20/023; B23K 37/00; B23K 35/40; B21C 23/00
(Continued)

(56) References Cited

U.S. PATENT DOCUMENTS

| 4,085,606 A | 4/1978 | Lugosi |
| 4,362,485 A * | 12/1982 | Slater .................... B21C 23/005 |
| | | 425/190 |

(Continued)

FOREIGN PATENT DOCUMENTS

| CN | 2451325 Y | 10/2001 |
| CN | 101327495 A | 12/2008 |

(Continued)

OTHER PUBLICATIONS

Extended European Search Report dated Nov. 4, 2015 (European Patent Application No. 128589173).
(Continued)

*Primary Examiner* — Thien S Tran
(74) *Attorney, Agent, or Firm* — Alix, Yale & Ristas, LLP

(57) ABSTRACT

A device for solid state joining of light metals like aluminum is described. The device utilizes the principle of continuous extrusion to add a string of filler metal into a groove separating the components to be joined, and shear deformation for surface oxide removal in the groove. The device comprises a rotating drive spindle (13) terminated in a drive spindle head (14). A groove with the shape of a circular arc constituting an extrusion chamber (16) is machined in the outer surface (15) of the drive spindle head (14), the extrusion chamber (16) being limited radially outwards by a stationary annular metal shoe (17) surrounding the drive spindle head (14), the extrusion chamber (16) being terminated by an integrated (fixed) or replaceable abutment member (18) for diverting aluminum from its circular movement in the extrusion chamber (16) through a die orifice (19).

15 Claims, 3 Drawing Sheets

(51) Int. Cl.
*B23K 20/02* (2006.01)
*B21C 23/00* (2006.01)
*B23K 20/00* (2006.01)
*B23K 35/40* (2006.01)
*B23K 37/00* (2006.01)
*B23K 103/10* (2006.01)

(52) U.S. Cl.
CPC .......... *B23K 20/023* (2013.01); *B23K 35/40* (2013.01); *B23K 37/00* (2013.01); *B23K 2203/10* (2013.01)

(58) Field of Classification Search
USPC ....... 72/38, 42, 46, 60, 260, 262; 228/112.1, 228/113, 114.5, 165; 219/74, 76.1, 219/121.64
See application file for complete search history.

(56) References Cited

U.S. PATENT DOCUMENTS

| | | | |
|---|---|---|---|
| 4,598,567 A * | 7/1986 | Backus | B21C 23/005 72/262 |
| 5,167,138 A * | 12/1992 | Sinha | B21C 23/005 72/253.1 |
| 5,335,527 A | 8/1994 | Nagai et al. | |
| 2005/0011933 A1 * | 1/2005 | Grong | B21C 23/005 228/165 |
| 2006/0130549 A1 | 6/2006 | Zhu et al. | |
| 2006/0156781 A1 * | 7/2006 | Leiponen | B21C 29/006 72/262 |

FOREIGN PATENT DOCUMENTS

| | | |
|---|---|---|
| CN | 201442041 U | 4/2010 |
| FR | 2516105 A1 | 5/1983 |
| GB | 2149714 A | 6/1985 |
| JP | H1119713 A | 1/1999 |
| SU | 1049218 A | 10/1983 |
| SU | 1757823 A1 | 8/1992 |
| WO | 9615867 A1 | 5/1996 |
| WO | 03043775 A1 | 5/2003 |

OTHER PUBLICATIONS

International Search Report and Written Opinion dated May 6, 2013 (PCT/N02012/050255).

Grong, Ø. "Recent Advances in Solid-State Joining of Aluminium" Welding Journal, Jan. 2012, pp. 26-33, fig. 12, ISSN 0043-2296; based on a lecture presented at FABTECH, Chicago, Nov. 2011.

* cited by examiner

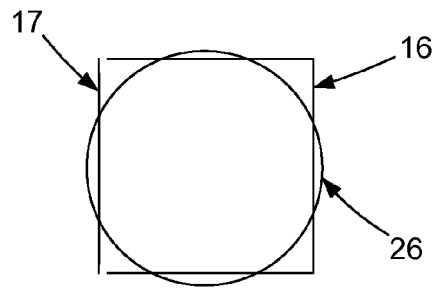
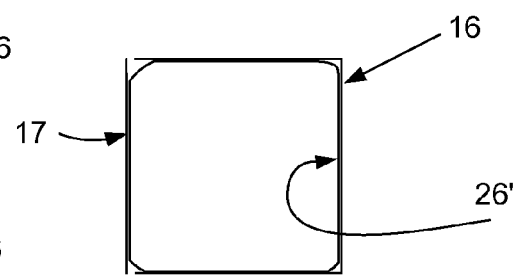
Figure 2a        Figure 2b
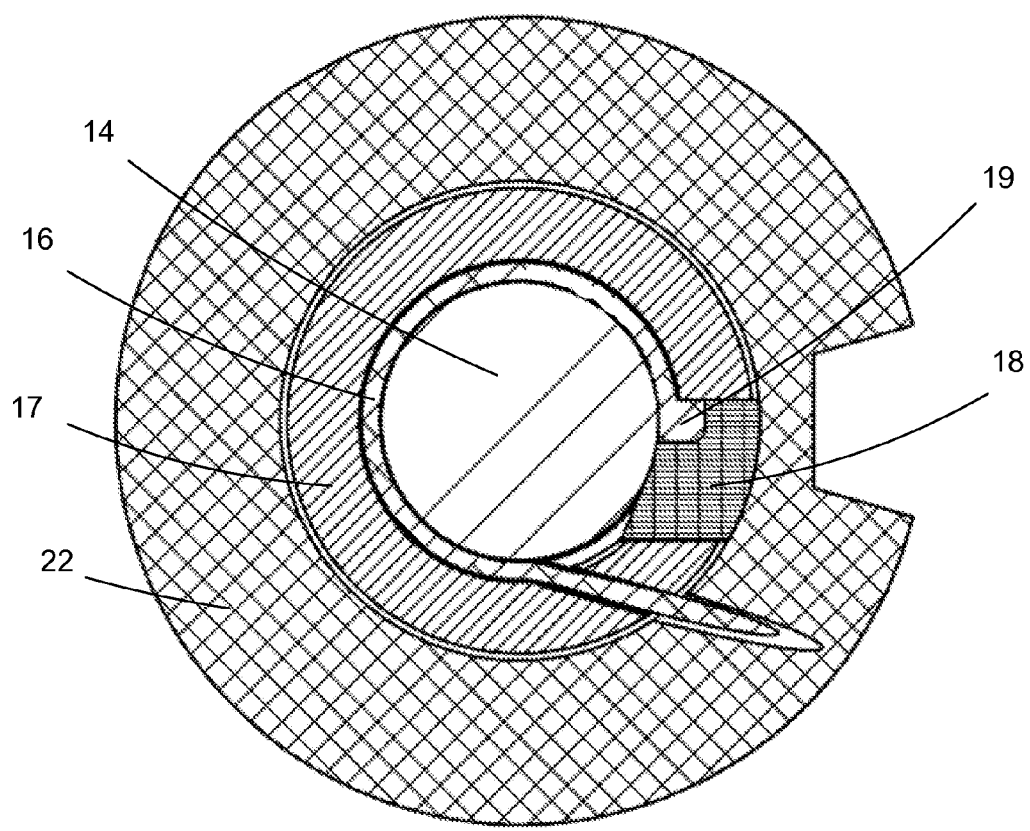
Figure 3

DEVICE FOR SOLID STATE JOINING OF LIGHT METALS

BACKGROUND

The disclosure concerns a device for joining of light metal components and alloys, particularly aluminum components, including alloys of aluminum and hybrids/composites containing light metals and in particular aluminum. The device utilizes the principle of continuous extrusion to add a string of filler metal into a groove separating the components to be joined, and shear deformation for surface oxide removal in the groove.

Traditionally techniques for joining metal components have come as a result of adapting techniques initially developed for joining of ferrous metals.

Joining of metals has largely been connected with fusion welding, where both the base metal and possible filler metal are melted by an electric arc, electron beam or laser beam, allowing metal to metal bonding to be achieved in the trailing part of the weld pool during crystallization. In fusion welding only a fraction of the energy supplied contributes to the melting and thereby to bonding. Most of the energy supplied leads to a local heating of the base metal and the formation of a so-called heat-affected zone (in the literature commonly referred to as HAZ) around the weld joint. This zone represents a problem, because the resulting microstructural changes lead to a permanent mechanical degradation of the parent metal. The properties of the weld zone will thus become the limiting factor in engineering design and, in practice, determine the load-bearing capacity of the component. In addition, the excess energy (i.e. heat) supplied leads to high residual stresses in the weld region as well as to global deformations and distortions. These problems are greater in aluminum welding than in steel welding, since the possibilities of taking the necessary precautionary actions, e.g. by modifying the HAZ microstructure through adjustment of the base metal chemical composition, are more difficult in the former case.

In general, the use of more effective welding processes like laser welding and electron beam welding provide a much narrower HAZ, which in this respect represents a significant improvement. These techniques, however, introduce other problems related to the hot cracking resistance and pore formation in the fusion zone. In addition, they suffer from the disadvantage of more costly and less versatile equipment. Furthermore, the tolerance requirements are much more severe due to the fact that a filler metal is usually not added.

In the past, several attempts have been made in order to develop alternative techniques for joining of light metals, of which friction welding or a variant known as friction stir welding (FSW) probably is most known. In FSW the two plates to be joined together are pressed firmly against each other while a rotating tool is moved along the interface (edge) between them, removing the oxide layer that—at least for aluminum—always will be present on the surface. Even though considerable frictional heating occurs at the interface between the rotating tool and the parent aluminum plates, the energy supplied, and thereby the heat generated, is less than in fusion welding, so that the base metal near the joint will not melt and reach a liquid state. Friction stir welding is thus an example of a solid state joining technique, which represents an improvement compared to fusion welding, as several of the common problems are thereby reduced, namely development of high residual stresses and hot cracks, pore formation and a low corrosion resistance. On the other hand, this novel technique is encumbered with several disadvantages, one being the requirement that the surfaces to be joined need to exactly match each other, as there is no possibility of using a filler metal. Another disadvantage is that the components to be joined must be pressed against each other with a considerable force, which means that the method requires heavy and rigid equipment. Finally, even this type of friction welding gives rise to the formation of a wide HAZ, where the resulting microstructural changes lead to permanent softening of the precipitation strengthened metal.

Among other methods of joining brazing, riveting and adhesive bonding should be mentioned. One or more of these methods may be convenient for some areas of application, but, in general, they provide a low safety against failure and are therefore not realistic alternatives to welding in load or weight carrying constructions.

In WO 03/043 775 a particular method for joining components of light metals such as aluminum, is described. The method is based on the principle of continuous extrusion, and the aim is to reduce or eliminate the disadvantages of the excessive heating related to the FSW method and other prior art methods. In WO 03/043 775 an adequate device was also principally described. Though the method seemed promising, the device was not developed to a level allowing industrial use of the method.

Thus, there is still a need for a device that is useful for industrial scale joining of aluminum components and other light metal components based on extrusion.

SUMMARY

The disclosure provides a device for industrial scale joining of light metal components based on the principle of extrusion, thus eliminating the disadvantage of excessive heating so that high residual stresses, deformations, hot cracks or extraordinary problems of corrosion will not be a major concern.

The disclosure also provides a device for industrial scale joining of light metal components that is simple, inexpensive, reliable and robust, (which may easily be scaled up or down) and which may be robotized.

The device comprises a specially designed extruder head which constitutes the core of the disclosure. In addition the device comprises a motor and drive for the spindle, it also comprises holder and feeding mechanism for the string to be extruded. These components can have any form known in the art and are therefore not further described in this document.

The term "light metal" as used herein shall be interpreted to include alloys of such light metals and in particular aluminum and alloys thereof.

The required bonding temperature is achieved by utilizing the heat that evolves from deformation and friction, optionally combined with local heating, e.g. in the form of electrical resistance heating, induction heating, (or heating with a laser beam).

By use of the device according to the disclosure a string of filler metal is added to the joint (groove) between the components to be joined. It is not required to apply a high force to the components, which allows the device to be made compact and simple and, if required, suitable for portable or robotized use.

The string of filler metal (ex. aluminum) is plasticized by the extrusion process and can easily pass through the die and fill the groove into which it is directed. As the filler with dimension fixed by the die orifice enters the slightly narrower groove, shear deformation will occur and remove the oxide layer of the components to be joined, thus allowing intimate contact and metallic bonding between the atoms of the components to be joined and the string of filler metal. Therefore, without excessive heating of the components and the disadvantages resulting therefrom, a weldlike bonding is formed. Even when local heating is applied to the filler metal leaving the die orifice, the heating of the components to be joined is moderate.

BRIEF DESCRIPTION OF THE DRAWINGS

The disclosure will now be further described in the form of a non-limiting embodiment with reference to the drawings, where:

FIGS. 2a and 2b are schematic illustrations of the cross-section of the extrusion chamber and the string of filler metal before and during extrusion, respectively.

FIG. 3 is an end sectional view of the extruder head of FIG. 1.

DETAILED DESCRIPTION

Figure 1:
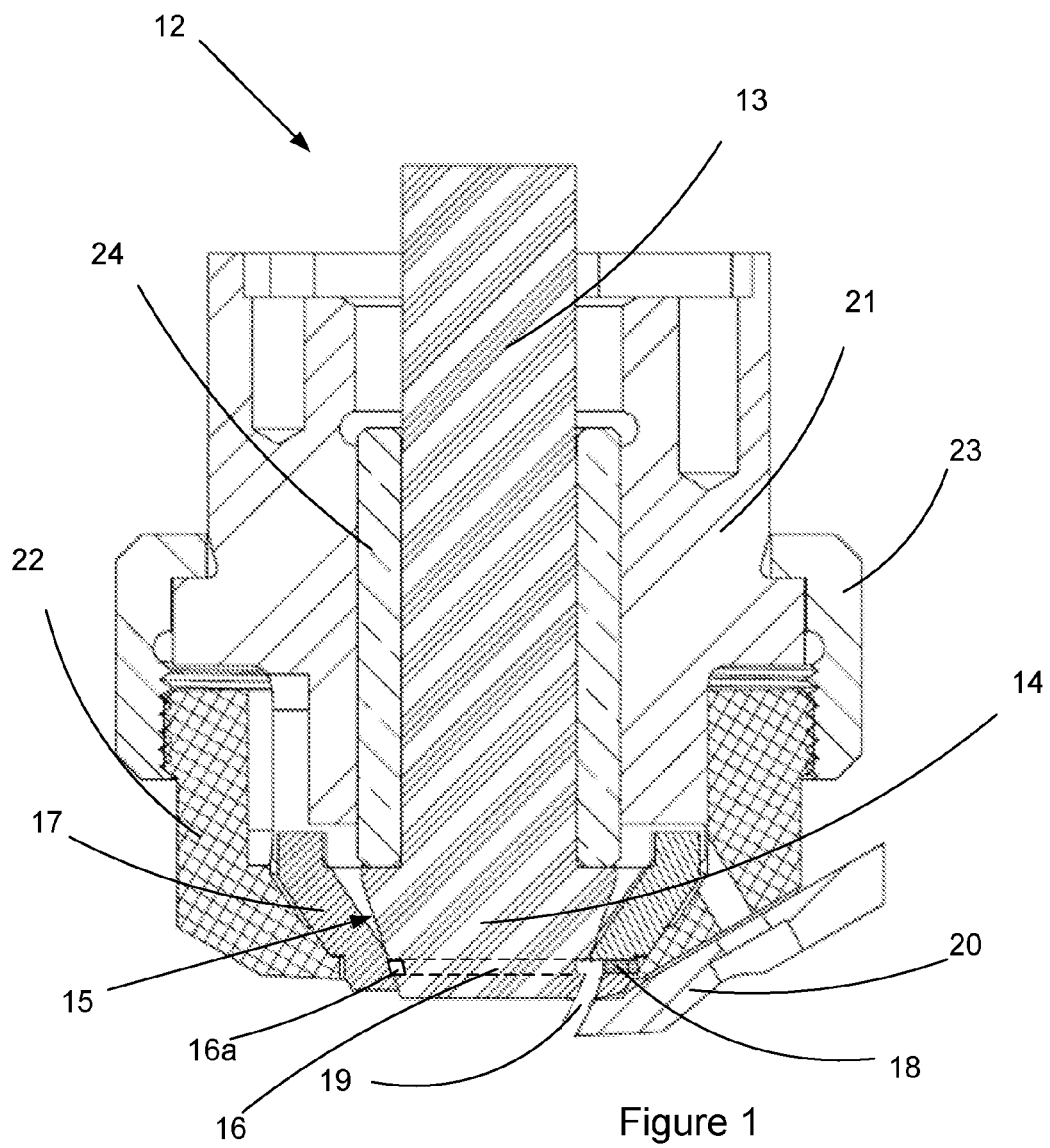
FIG. 1 is a side sectional view of an embodiment of an extruder head according to the disclosure.

FIG. 1 shows extruder head 12 where a rotatable drive spindle 13 is a core element. At its lower end the drive spindle 13 is extended to a drive spindle head 14 having a smooth outer surface 15, the surface typically being frusto-conical but may also be cylindrical. Circumferentially in the drive spindle head a 360 degrees groove is machined forming parts of the extrusion chamber 16 as explained more in detail below. Depending on the position of the entrance point 16a for the filler metal string, the actual extrusion chamber can typically extend 180 degrees or more around the circumference of the surface 15 of the drive spindle head 14, more typical about 270 degrees and is commenced at an entrance point 16a and terminated at the die orifice 19. The extrusion chamber 16 thus has the general shape of a circular arc rather than a full circle as better illustrated by FIG. 3.

The termination of the extrusion chamber 16 is made effective by a separate abutment member 18 being arranged into the groove adjacent to the die orifice 19 and preferably held securely in place during operation in a manner to be further described below. The function of the abutment member 18 is to divert the plasticized metal string being pulled through the extrusion chamber from a circular movement and out through the orifice 19. It is inevitable that there is a pressure increase in front of the abutment member which contributes to the plasticization of the metal string and makes it easier to leave the extruder head through the die orifice 19.

Radially outwards from the extrusion chamber 16 a stationary metal shoe 17 is arranged to delimit the extrusion chamber radially outwards. The surface of the metal shoe 17 facing the surface 15 of the drive spindle head 14 is inclined with an angle that corresponds to the inclination of the surface 15 in the area around the extrusion chamber 16 to form a mainly tight fit. In the area above, however, it is preferred that the inclination of the metal shoe 17 deviates from the inclination of the drive spindle head in order to avoid a larger contact surface between the two than necessary, which would undesirably increase the friction between the two. It is thus preferred that the stationary metal shoe 17 surrounding the drive spindle head 14 has an inner surface so adapted to the frusto-conical or cylindrical surface of the drive spindle head 14 that it tightly contacts the surface of the drive spindle head 14 in a limited area on both sides of the extrusion chamber 16.

The metal shoe could be formed with an abutment member as an integrated part thereof, but the wear of the abutment member is significant and it is therefore more convenient to have the abutment member 18 as a separate, replaceable member. The metal of the stationary metal shoe 17 is preferably a hardened steel alloy.

It is highly preferred, though it is not a requirement, that the extruder head is provided with means for local heating 20 of the die orifice 19 to thereby reduce the pressure of the system and thereby the wear of the components. Such means for local heating can have the form of electric resistivity heating, preferably arranged so that the metal leaving the die orifice is part of the electric circuit. Other means for local heating can be in the form of induction heating (or even in the form of a laser heating locally).

For practical purposes and safety purposes, the extruder head is protected by a housing that partially serves to hold the parts together, partially protects the vital components from dirt and damage and partially protects personnel from injuries. The housing can comprise an annular spindle housing 21 surrounding the rotatable drive spindle and an annular spindle head housing 22 surrounding the drive spindle head 14 and the metal shoe 17, the spindle housing 21 and the spindle head housing 22 being tightly attached by a threaded nut 23. Preferably a bearing 24, e.g. a brass bearing, is provided between the drive spindle 13 and the spindle housing 21 to ensure low friction and high rigidity of the extruder head.

It should be noted that the terms "upper" and "lower" as used herein are just for relation to the drawings since the orientation of the extruder head may vary, although the extruder head will typically be so arranged for use that it is positioned substantially vertical, for practical purposes advantageously a few degrees tilted from vertical position so that just the die orifice opening is brought in contact with the components to be joined, typically being arranged in the horizontal plane below the extruder head.

FIG. 2a shows a typical and mainly square cross-section of the extrusion chamber 16, where three of the walls are made up by the drive spindle head 14, while the fourth wall is made up by the metal shoe 17. A string of filler metal 26 also shown in FIG. 2a has a mainly circular cross-section and a diameter that is slightly larger than the linear dimension of the extrusion chamber. FIG. 2a depicts the cross-sections before the string has entered the extrusion chamber.

When entering the extrusion chamber the metal string is squeezed by the walls of the extrusion chamber 16 so that it attains a cross-sectional shape that is nearly square as illustrated by FIG. 2b.

The diameter of the filler metal string is chosen such that the cross-sectional area is slightly smaller for the metal string 26 than the entire square of the extrusion chamber 16, therefore there will be small open voids at the corners of the extrusion chamber 16. Adapting the diameter of the filler metal string to the dimension of the extrusion chamber is an important practical element which may be achieved by trial and error. On one hand it is important that the dimension of the filler metal string is large enough to provide a good squeeze, on the other hand it must not be so large that the string is prevented from entering the extrusion chamber. As an indication of magnitude, if the diameter of the metal string 26 is 7% larger than the linear dimension of a square extrusion chamber, the cross-sectional area of the latter is 10% larger than the cross-sectional area of the string 26.

When the string is held and pulled by the frictional force from the walls of the extrusion chamber 16, it is surrounded by three walls that pull in the direction of movement while also being squeezed by one stationary wall, namely the metal shoe 17, that inflicts a frictional force seeking to retard or oppose the movement. This latter frictional force, while insufficient to stop the movement of the string, contributes to the heating and plasticization thereof. There is thus a more or less continuous increase in plasticity of the metal string 26 from its entrance 16*a* into the extrusion chamber and to the die orifice 19.

In practice, the fitting of the metal shoe 17 against the outer lateral side of the drive spindle head 14 is such that a slight "leakage" of plasticized light metal is allowed from the extrusion chamber 16, the plasticized light metal functioning as a lubricant between the mutually moving spindle head 14 and metal shoe 17.

The choice of filler metal and alloy composition is always made so that its properties match the properties of the metal components to be joined.

FIG. 3 is an end sectional view of the extruder head of FIG. 1. In FIG. 3 the lower end of the drive spindle head 14 is visible, as are also the abutment extrusion chamber 16, the metal shoe 17, the abutment member 18, the die orifice 19, and the spindle head housing 22.

Figure 4:
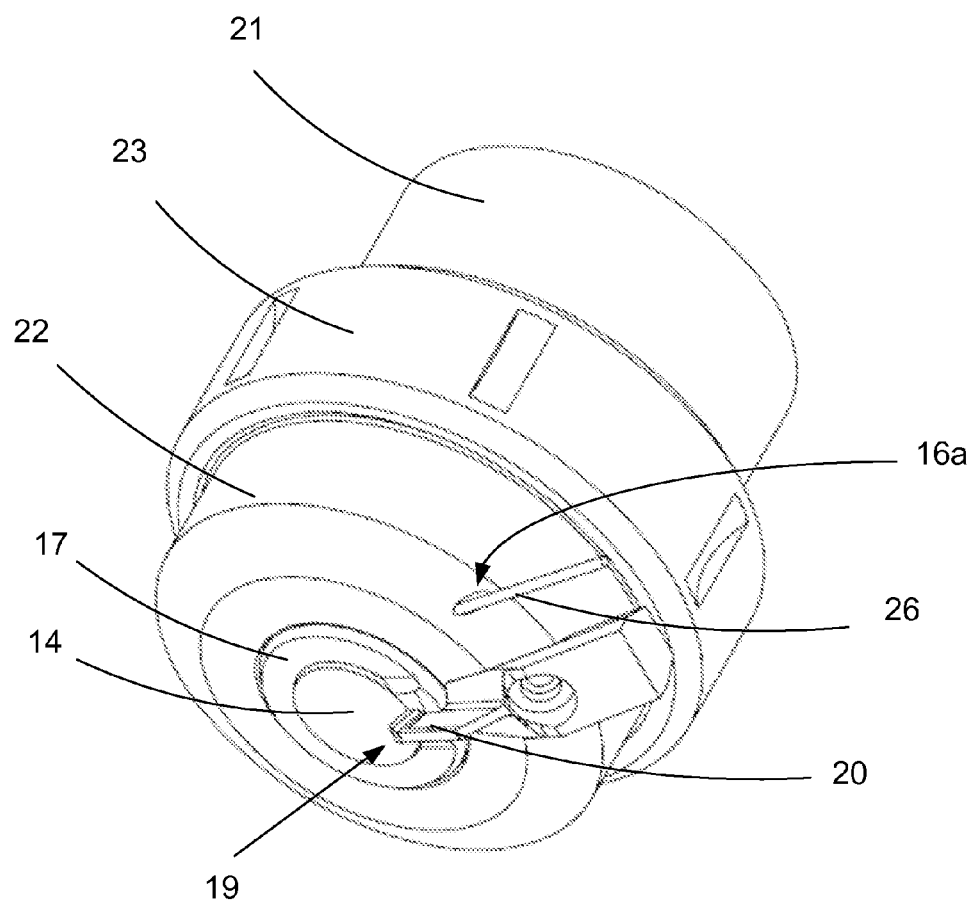
FIG. 4 is a perspective view of the extruder head according to the disclosure.

FIG. 4 is a perspective view of the drive spindle head, the main visible elements again being the drive spindle head 14, the entrance 16*a* to the extrusion chamber, the metal shoe 17, the upper 21 and lower 22 spindle housing, the nut 23 and a string of metal 26 to be plasticized and used as filler metal for the joining. As seen in FIG. 4, the stationary metal shoe 17 is arranged at a free, circular, and substantially plane side of the drive spindle head 14.

The filler metal may optionally also comprise different metals and elements to improve the mechanical or electrical properties. In general the filler metal to be used must be compatible with the base metal and may be adjusted in accordance with this in order to optimize properties like extrudability, yield and tensile strength, toughness, ductility, fatigue strength and corrosion resistance during or following the joining operation. The filler metal may thus initially contain different elements or phases that from extrusion practice and industrial heat treatment are known to e.g. suppress recrystallization and enhance precipitation, thereby recovering additional strength following natural or artificial ageing. Except for such minor deviations the chemical composition should be as close as possible to that of the base metal in order to obtain the desired corrosion properties.

The device and method according to the disclosure are principally suited for joining of all types of sheet, tubes and profiles that can be joined by conventional welding processes and methods, and at all positions. It may in principle be applied to spot welding of sheets (also in combination with adhesive bonding) as an alternative to electrical resistance welding, riveting or other form of mechanical joining. A further aspect is that the device and method may be performed with compact, lightweight and inexpensive equipment.

The invention claimed is:

1. A device for solid state joining of light metals, utilizing continuous extrusion to add a string of filler metal into a groove separating light metal components to be joined, comprising a drive spindle (13) that rotates about an axis and terminates in a drive spindle head (14), the drive spindle head (14) having an outer surface (15) with a circular arc constituting an extrusion chamber (16) machined therein, a stationary annular metal shoe (17) radially limiting the extrusion chamber (16) outwards and surrounding the drive spindle head (14), and an integrated or replaceable abutment member (18) terminating the extrusion chamber (16) and diverting the string of filler metal (26) from its circular movement in the extrusion chamber out through a die orifice (19) substantially in the axial direction.

2. The device of claim 1, wherein the stationary metal shoe (17) defines the die orifice (19) and the die orifice (19) is arranged at a free, circular, and substantially plane side of the drive spindle head (14).

3. The device of claim 1, wherein the drive spindle head (14) has a frusto-conical or cylindrical surface.

4. The device of claim 3, wherein the stationary metal shoe (17) surrounding the drive spindle head (14) has an inner surface so adapted to the frusto-conical or cylindrical surface of the drive spindle head (14) that it tightly contacts the surface of the drive spindle head (14) in a limited area on both sides of the extrusion chamber (16).

5. The device of claim 1, wherein the components to be joined and the string of filler metal (26) leaving the die orifice (19) are heated to a given temperature with localized heating.

6. The device of claim 5, wherein the localized heating is selected from one or more of the methods consisting of electrical resistance heating, induction heating or other Joule heating apparatus.

7. The device of claim 1, wherein the drive spindle (13) is protected by an annular spindle housing (21) arranged to be attached at one end to the metal shoe (17).

8. The device of claim 7, comprising a bearing (24) between the drive spindle (13) and the annular spindle housing (21).

9. The device of claim 1, wherein the arc constituting the extrusion chamber (16) has a width that is adapted closely to a diameter of the string of filler metal (26) to be extruded.

10. The device of claim 1, wherein the arc constituting the extrusion chamber (16) has a width and a depth that is less than the diameter of the string of filler metal (26), and a cross-sectional area that is slightly larger than that of the filler metal string.

11. The device of claim 1, wherein the stationary metal shoe (17) is made from a hardened steel alloy.

12. The device of claim 1, wherein the abutment member (18) is held in a slot of the metal shoe (17) allowing a free end of the abutment member to be readily available for retrieval and replacement.

13. The device of claim 1, wherein the abutment member (18) is an integrated part of the metal shoe (17).

14. The device of claim 1, wherein the stationary metal shoe (17) comprises aluminum.

15. The device of claim 14, wherein the stationary metal shoe (17) is selected from one or more of the group consisting of aluminum, aluminum alloy, and hybrids/composites containing light metals and in particular aluminum.

* * * * *